(12) United States Patent
Lin (10) Patent No.: US 9,826,832 B2
(45) Date of Patent: Nov. 28, 2017

(54) FIXING DEVICE FOR CHAIRS

(71) Applicant: SPEC SEATS TECHNOLOGIES INC., Chung-Li, Taoyuan Hsien (TW)

(72) Inventor: Mei Chuen Lin, Chung-Li (TW)

(73) Assignee: SPEC SEATS TECHNOLOGIES INC., Chung-Li (TW)

( * ) Notice: Subject to any disclaimer, the term of this patent is extended or adjusted under 35 U.S.C. 154(b) by 66 days.

(21) Appl. No.: 14/968,388

(22) Filed: Dec. 14, 2015

(65) Prior Publication Data

US 2016/0095434 A1    Apr. 7, 2016

Related U.S. Application Data

(63) Continuation-in-part of application No. 14/282,446, filed on May 20, 2014, now Pat. No. 9,226,592.

(51) Int. Cl.

| | |
|---|---|
| *A41F 1/00* | (2006.01) |
| *A47B 87/00* | (2006.01) |
| *F16B 2/06* | (2006.01) |
| *F16B 2/10* | (2006.01) |
| *A47C 1/124* | (2006.01) |
| *A47C 7/58* | (2006.01) |

(52) U.S. Cl.
CPC ............ *A47B 87/007* (2013.01); *A47C 1/124* (2013.01); *A47C 7/58* (2013.01); *F16B 2/065* (2013.01); *F16B 2/10* (2013.01); *Y10T 24/4453* (2015.01)

(58) Field of Classification Search
CPC ..... A47C 31/00; A47C 1/124; Y10T 24/3444; Y10T 403/7141
See application file for complete search history.

(56) References Cited

U.S. PATENT DOCUMENTS

| | | | |
|---|---|---|---|
| 1,198,726 A | 9/1916 | Huntley | |
| 1,934,396 A | 11/1933 | Bales | |
| 2,637,081 A * | 5/1953 | Henrikson | A47C 1/124 297/248 |
| 2,750,990 A | 6/1956 | Eves | |
| 2,821,762 A * | 2/1958 | Foose | A47C 1/124 24/115 G |
| 3,188,138 A * | 6/1965 | Lockshin | A47C 1/124 108/64 |

(Continued)

FOREIGN PATENT DOCUMENTS

TW            M328232 U       3/2008

*Primary Examiner* — Victor Batson
*Assistant Examiner* — Matthew Sullivan
(74) *Attorney, Agent, or Firm* — Rabin & Berdo, P.C.

(57) ABSTRACT

A fixing device includes an encircle element having lateral sides and left and right flap portions located inwardly of the lateral sides and extending transversely and outwardly from the lateral sides to define left and right chambers which are accessible only from the same direction, each of the left and right lateral sides being formed with a through hole; a fixing element installed on the encircle element at one of the through holes; and a locking plate having a first end fastened movably to the encircle element via a fastener such that the locking plate is movable relative to the encircle element between a locked position, where a second end of the locking plate engages the fixing elements, thereby preventing access into the chambers, and an unlocked position, where the locking plate disengages the fixing elements, thereby permitting access into the chambers.

5 Claims, 8 Drawing Sheets

(56) References Cited

U.S. PATENT DOCUMENTS

| | | | |
|---|---|---|---|
| 3,207,551 A | | 9/1965 | Axtell |
| 3,227,487 A | | 1/1966 | Blanchard, Jr. |
| 3,291,523 A | | 12/1966 | Krueger |
| 3,314,718 A | | 4/1967 | Crandall |
| 3,383,738 A | | 5/1968 | Fox |
| 3,669,491 A | | 6/1972 | Weslock |
| 3,825,300 A | | 7/1974 | Lieberman et al. |
| 4,066,373 A | * | 1/1978 | Workman ............... A47C 1/124 24/339 |
| 4,078,367 A | * | 3/1978 | Wessel ................... A01D 78/08 24/535 |
| 4,224,721 A | | 9/1980 | Ohlson |
| 4,699,129 A | * | 10/1987 | Aaserude ............. A61F 5/0123 602/16 |
| 5,004,219 A | * | 4/1991 | Godlewski ............... B65H 1/02 271/116 |
| 5,542,159 A | | 8/1996 | Schultz et al. |
| D392,180 S | | 3/1998 | Bilow |
| 5,957,530 A | | 9/1999 | Gutgsell |
| 7,111,902 B1 | | 9/2006 | Conner |
| 7,607,733 B1 | | 10/2009 | Lin et al. |
| 8,708,290 B2 | * | 4/2014 | Franta .................. B65H 57/003 248/219.3 |
| 9,226,592 B2 | * | 1/2016 | Lin ........................ A47C 31/00 |
| 2005/0012371 A1 | | 1/2005 | Mendenhall et al. |
| 2007/0210631 A1 | | 9/2007 | Berning et al. |
| 2009/0152919 A1 | | 6/2009 | Lin et al. |
| 2010/0176634 A1 | | 7/2010 | Wahl et al. |
| 2012/0013156 A1 | | 1/2012 | Tsai et al. |
| 2012/0286551 A1 | | 11/2012 | Kumazawa |
| 2014/0152059 A1 | | 6/2014 | Swy |

* cited by examiner

FIXING DEVICE FOR CHAIRS

CROSS REFERENCE TO RELATED APPLICATION

This application is a continuation-in-part of U.S. patent application Ser. No. 14/282,446, filed on May 20, 2014, which is incorporated herewith by reference.

BACKGROUND OF THE INVENTION

1. Field of the Invention

The present invention relates generally to a fixing device, and more particularly to a fixing device for chairs, especially for connecting and fixing an adjacent pairs of chairs or a row of chairs.

2. The Prior Arts

In an assembly hall or a baseball stadium, pluralities of foldable chairs or seats are arranged in rows in order to permit seating of audience for watching a game or match. During the chair arrangement, after unfolding each independent chair, the adjacent pairs of chairs are coupled together via a connector or fixing device such that only a relatively small space is left between the adjacent pair of chairs. Under this condition, it may cause discomfort to the seated persons if at least one of them is fat or hefty. To eliminate the above drawback, the chairs should be arranged independently and individually so as to permit appropriate gap between adjacent two chairs, however this may lead to overall unevenness of the chairs.

Taiwan Patent No. M328232 discloses a chair spacer to be utilized between two adjacent chairs to provide an expansion space between the chairs. The chair spacer includes a frame body having a first engagement post and a fastening element with an engaging hole having a narrow hole section. One foldable chair has a front leg formed with a locking plate with a hole having a narrow hole section while another foldable chair has a second engagement post. For coupling the two chairs, the first engagement post is inserted through the locking plate deep into the narrow hole section of the hole, after which the fastening element is rotated in such a manner to so as to abut the other end tightly against the front leg of one chair. Then, the second engagement post of another chair is inserted through a hole in the frame body so as to abut against the narrow hole section of the hole, hence the two chairs are coupled together by the frame body and leaving an appropriate space between the chairs.

One drawback resulted from the use of the chair spacer disclosed according to the above patent, some locking plates with through hole having the narrow hole section must be welded on the sides of the chairs, thereby causing inconvenient to the user, and hence resulting in high manufacturing expense.

SUMMARY OF THE INVENTION

A primary objective of the present invention is to provide a fixing device for chair, which is simple in structure and which does not required any additional machining conducted on the chairs so as to reduce the manufacturing expense thereof.

A fixing device of the present invention for fixing two adjacent chairs, includes: an encircle element having left and right lateral sides and left and right flap portions that are located inwardly of the left and right lateral sides, that has at least one straight confining section and that extend transversely and outwardly from the left and right lateral sides to define left and right chambers respectively which are accessible only from the same direction, each of the left and right lateral sides being formed with a through hole; a fixing element installed to the encircle element at one of the through holes in the encircle element; and a locking plate having a first end fastened movably to one of the through holes in the encircle element via a fastener and a second end such that the locking plate is movable relative to the encircle element between a locked position, in which the locking plate moves toward the encircle element and hence engaging the second end of the locking plate to the fixing element, thereby shielding and preventing access into the left and right chambers, and an unlocked position, in which the locking plate moves away from the encircle element and hence disengaging the second end of the locking plate from the fixing element, thereby permitting access into the left and right chambers.

Preferably, an auxiliary fixing element serves the purpose of the fastener.

Alternately, a rivet may serve the purpose of the purpose of the fastener.

In this embodiment, the encircle element is generally an elongated integral piece which has undergone bending machining so as to form the left and right flap portions and the left and right restriction chambers.

Preferably, the left and right restriction chambers of the encircle element are generally U-shaped and are located inwardly of the left and right lateral sides.

Preferably, the left and right chambers of the encircle element are generally U-shaped and are located inwardly of the left and right lateral sides.

In this embodiment, each of the fixing elements consists of a wing bolt and a fastening nut and wherein each of the left and right ends of the locking plate is formed with a U-shaped notch having a width greater than a diameter of the wing bolt so as to permit engagement of the notches relative to the wing bolts.

Note that the left and right restriction chambers of the encircle element can be configured to have different depth or length in order to space an adjacent pair of the chairs in a row at different interval.

Since the fixing device of the present invention is constructed according to the requirement of the applications, the front or the rear legs of adjacent pairs of chairs can be disposed in the left and right restriction chambers of the encircle element and are connected together when the locking plate of the fixing device of the present invention is pivoted relative to the encircle element to a locked position and hence the chairs can be arranged in a straight line or in a curved line according to the requirement of the stadium or hall, in which the chairs are used.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
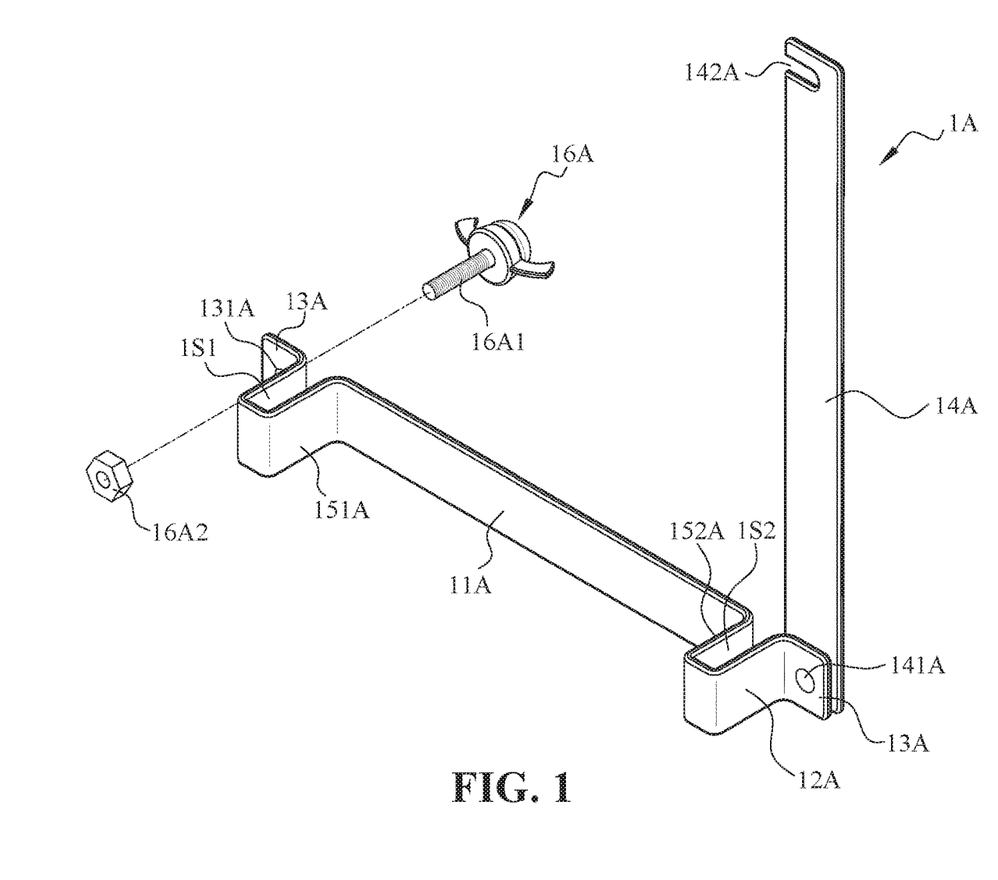
FIG. 1 is a perspective view of a chair fixing device according to a first embodiment of the present invention, wherein a locking plate of the fixing device is shown in an unlocked position relative to an encircle element.

FIG. 1 is a perspective view of a chair fixing device 1A according to a first embodiment of the present invention, wherein a locking plate of the fixing device is shown in an unlocked position relative to an encircle element. The fixing device 1A of the present invention includes an encircle element 11A, a fixing element 16A and a locking plate 14A. The encircle element 11A is made from metal by bending an elongated metal plate having an appropriate thickness and is an integral piece. The encircle element 11A has left and right lateral sides 13A and left and right flap portions 151A, 152A (or 12A) that are located inwardly of the left and right lateral sides 13A and that extend transversely and outwardly from the left and right lateral sides 13A to define left and right restriction chambers 1S1, 1S2 respectively which are accessible only from the same direction. In this embodiment, each of the left and right lateral sides 13A of the encircle element 11A is formed with a through hole 131A. Preferably, the encircle element 11A is generally an elongated integral piece which has undergone bending machining so as to form the left and right flap portions 151A, 152A and the left and right restriction chambers 1S1, 1S2. To be more specific, the left and right restriction chambers 1S1, 1S2 of the encircle element 11A are generally U-shaped and are located inwardly of the left and right lateral sides 13A respectively.

The fixing element 16A is installed to the encircle element 11A. In the first embodiment, the fixing element 16A consists of a wing bolt 16A1 inserted through one through holes 131A in the encircle element 11A from one side thereof and a fastening nut 16A2 mounted threadedly on the wing bolt 16A1 from the other side of the encircle element 11A.

Figure 2:
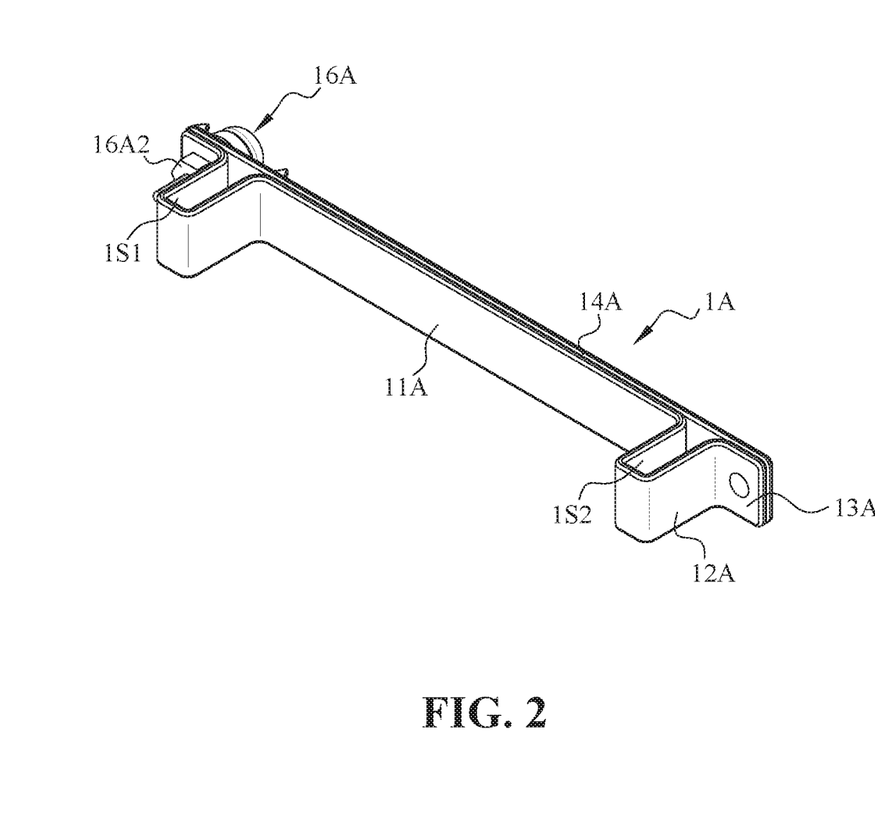
FIG. 2 is a perspective view of the chair fixing device according to the first embodiment of the present invention, wherein the locking plate of the fixing device is shown in a locked position relative to the encircle element.

The locking plate 14A has a first end connected pivotally to one of the through holes in the encircle element 11A via a rivet 141A and a second end such that the locking plate 14A is pivotable relative to the encircle element 11A between a locked position, in which the locking plate 14A rotates about the rivet 141A to move toward the encircle element 11A and hence engaging the second end of the locking plate 14A to the fixing element 16A (see FIG. 2), thereby shielding and preventing access into the left and right restriction chambers 1S1, 1S2 and an unlocked position, in which the locking plate 14A rotates about the rivet 141A so as to move away from the encircle element 11A and hence disengaging the second end of the locking plate 14A from the fixing element 16A, thereby permitting access into the left and right restriction chambers 1S1, 1S2 (see FIG. 1). Preferably, the second end of the locking plate 14A is formed with a U-shaped notch 142A for engaging the fastening screw 16A1 in the locked position. To be more specific, the notch 142A should have a width greater than the diameter of the wing bolt 16A1 for engaging thereon.

Figure 3:
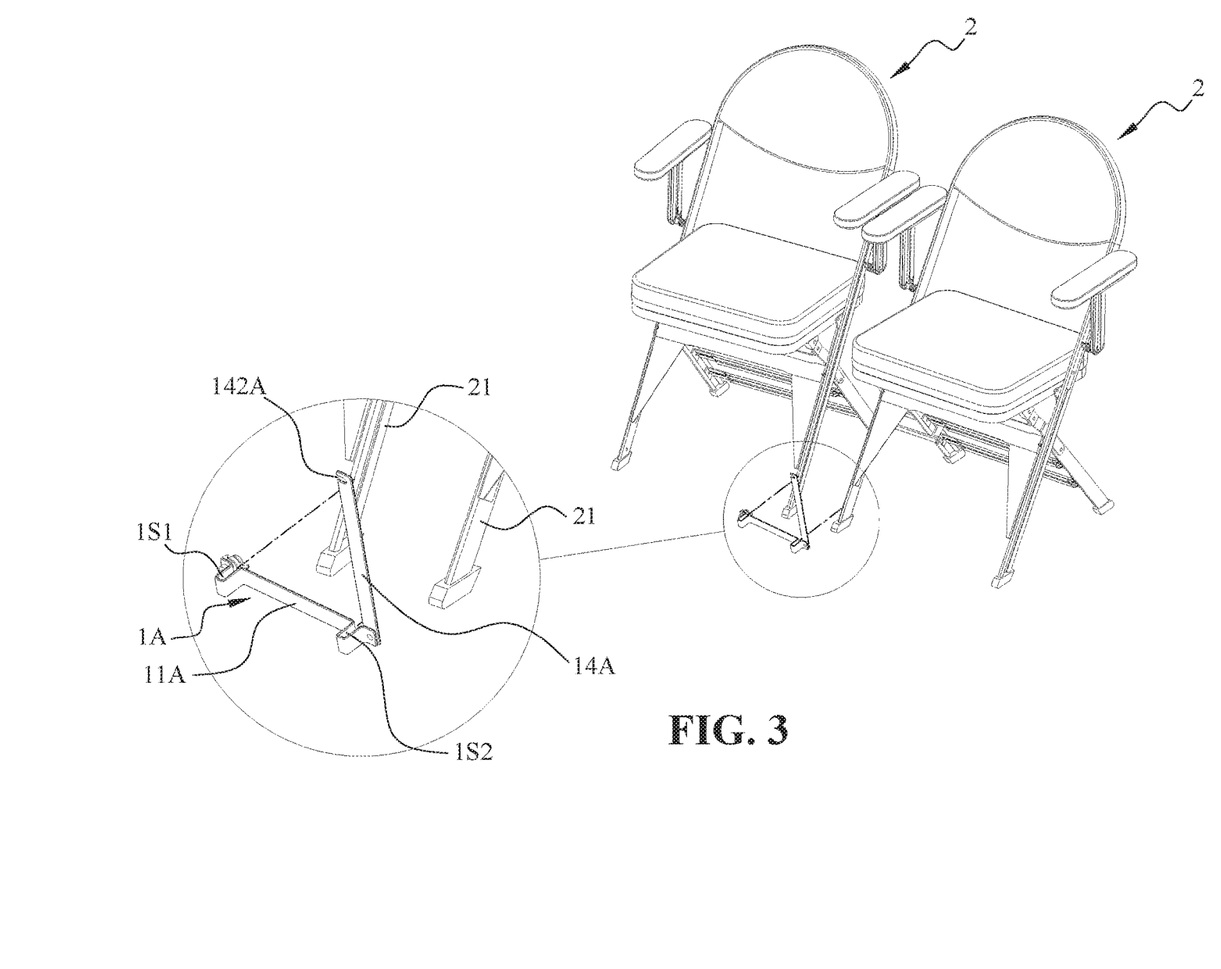
FIG. 3 shows the fixing device according to the first embodiment of the present invention, which fixes two front legs of an adjacent pair of chairs.
Figure 4:
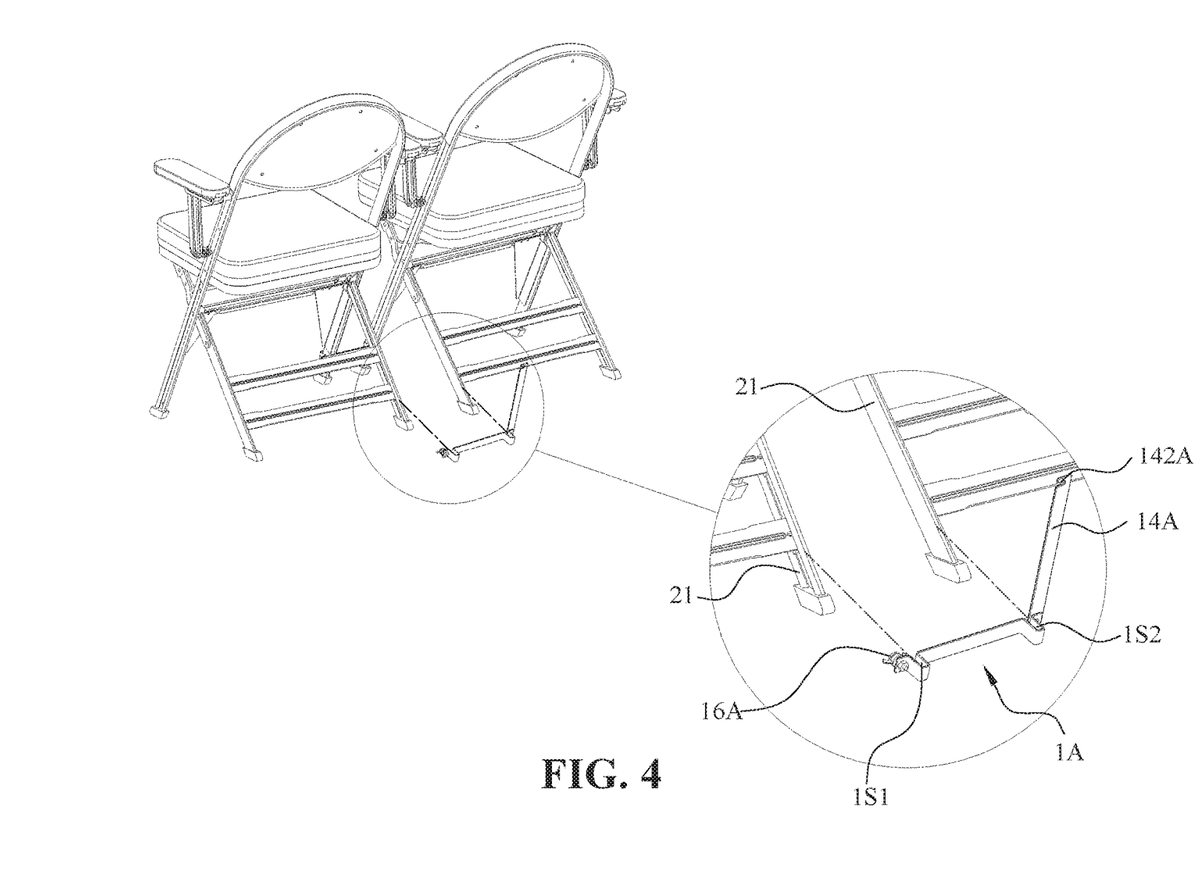
FIG. 4 shows the fixing device according to the first embodiment of the present invention, which fixes two rear legs of an adjacent pair of chairs.

FIG. 3 shows the fixing device 1A according to the first embodiment of the present invention, which fixes two front legs of an adjacent pair of chairs. When it is desired to connect an adjacent pair of chairs 2, the locking plate 14A is pivoted firstly relative to the encircle element 11A to the unlocked position, as best shown in the enlarged portion, where the left and right restriction chambers 1S1, 1S2 are pushed to encircle around the two front legs 21 of the adjacent pair of chairs 2, and after which, the locking plate 14A is pivoted relative to the encircle element 11A to the locked position. Rotation of the wing bolt 16A1 relative to the fastening nut 16A2 can result in tightening of the fixing element 16A, thereby preventing untimely disengagement of the locking plate 14A and the encircle element 11A. FIG. 4 shows the fixing device according to the first embodiment of the present invention, which fixes two rear legs 21 of an adjacent pair of chairs 2 in the preceding manner.

Figure 5:
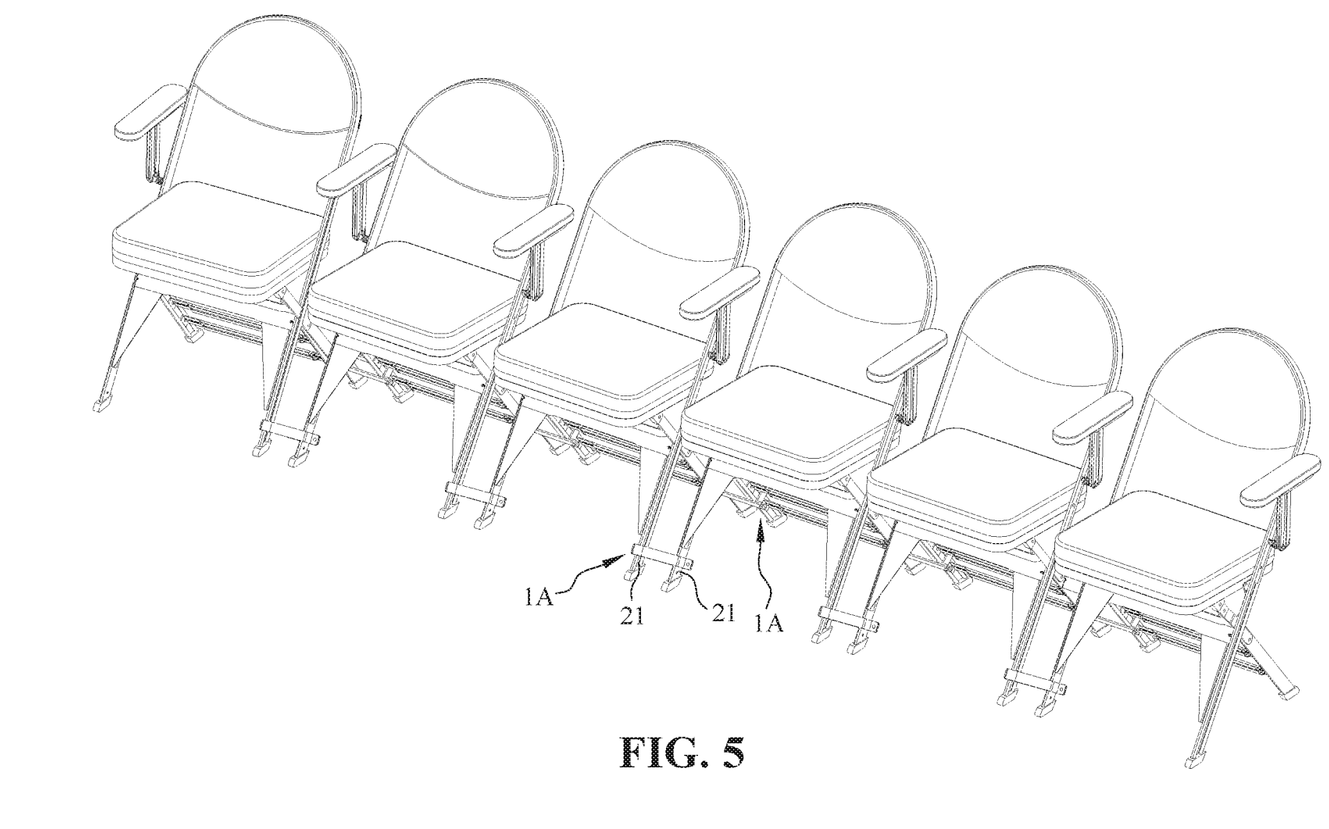
FIG. 5 shows the fixing device according to the first embodiment of the present invention, which fixes two front legs of an adjacent pair of chairs respectively such that a row of chairs extends in a straight line.

One aspect to note is that the dimension of the chair fixing device 1A of the present invention should not be limited only the above ones, the dimension thereof can be altered according the requirement of the chairs. FIG. 5 shows the fixing device according to the first embodiment of the present invention, which fixes two front and rear legs of an adjacent pair of chairs respectively such that a row of chairs extends in a straight line.

Figure 6:
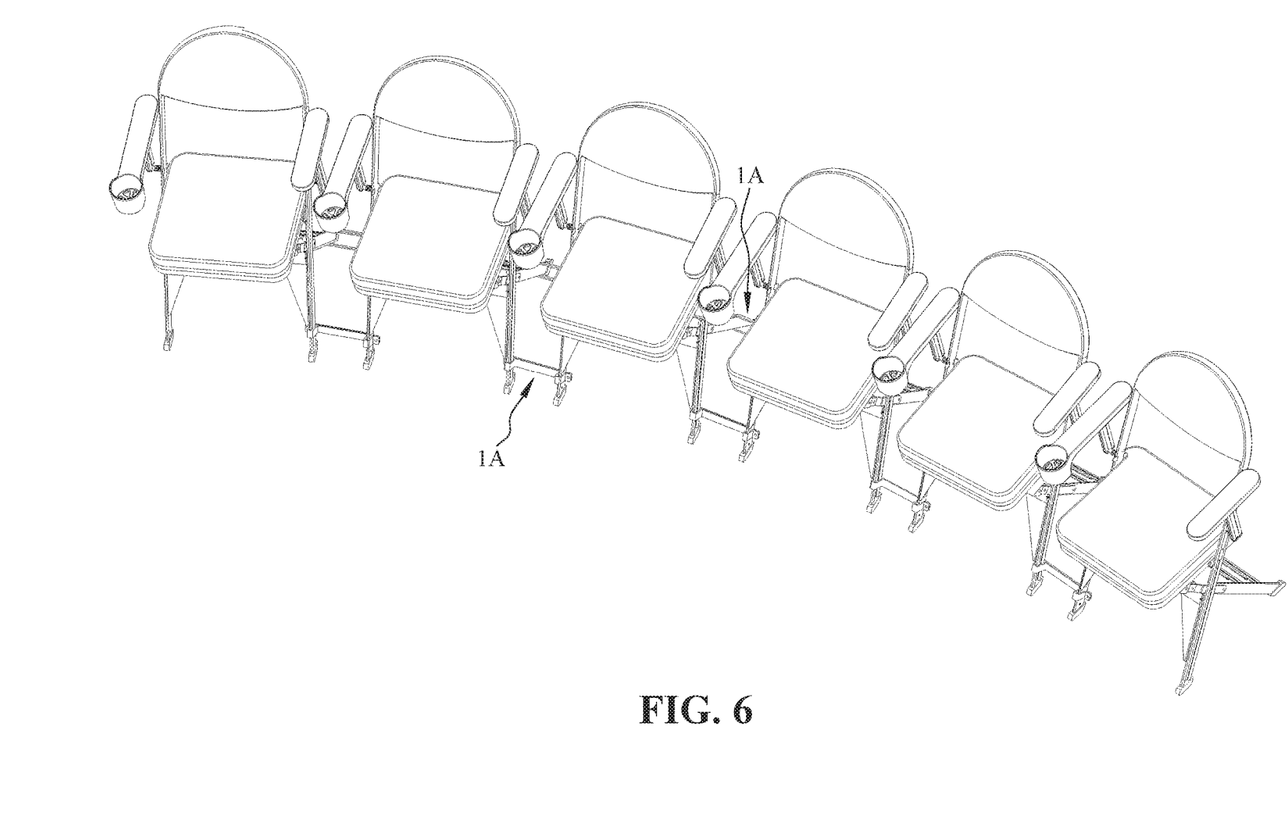
FIG. 6 shows the fixing device according to the first embodiment of the present invention, which fixes two front legs of an adjacent pair of chairs respectively such that a row of chairs extends in a curved line.

FIG. 6 shows the fixing device according to the first embodiment of the present invention, which fixes two front and rear legs 21 of an adjacent pair of chairs 2 respectively such that a row of chairs extends in a curved line. Note that a smaller size chair fixing device 1A of the present invention is implemented in order to connect the two front legs 21 of the adjacent pair of chairs 2 respectively while a larger chair fixing device 1A of the present invention is implement in order to connect the two rear legs 21 of the adjacent pair of chairs 2 respectively such that the row of chair 2 is arranged in the curved line.

Alternately and as described in the same manner, by reversing the smaller and larger fixing devices of the present invention, the row of chairs 2 can be arranged in a circle such that the backs of the chairs 2 face toward an axis of the circle (not visible).

Figure 7:
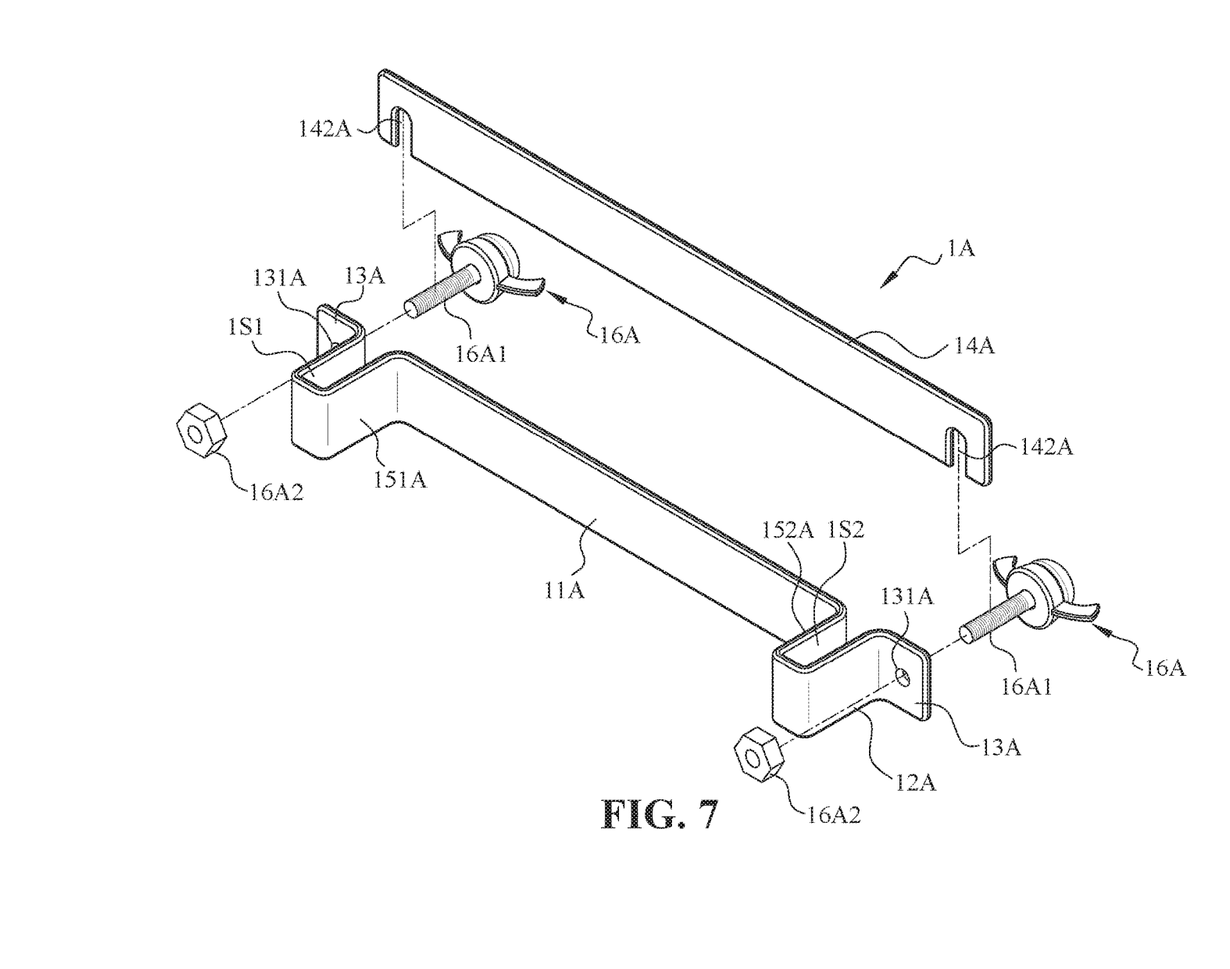
FIG. 7 is a perspective view of a chair fixing device according to a second embodiment of the present invention, wherein the locking plate of the fixing device is shown in an unlocked position relative to the encircle element.
Figure 8:
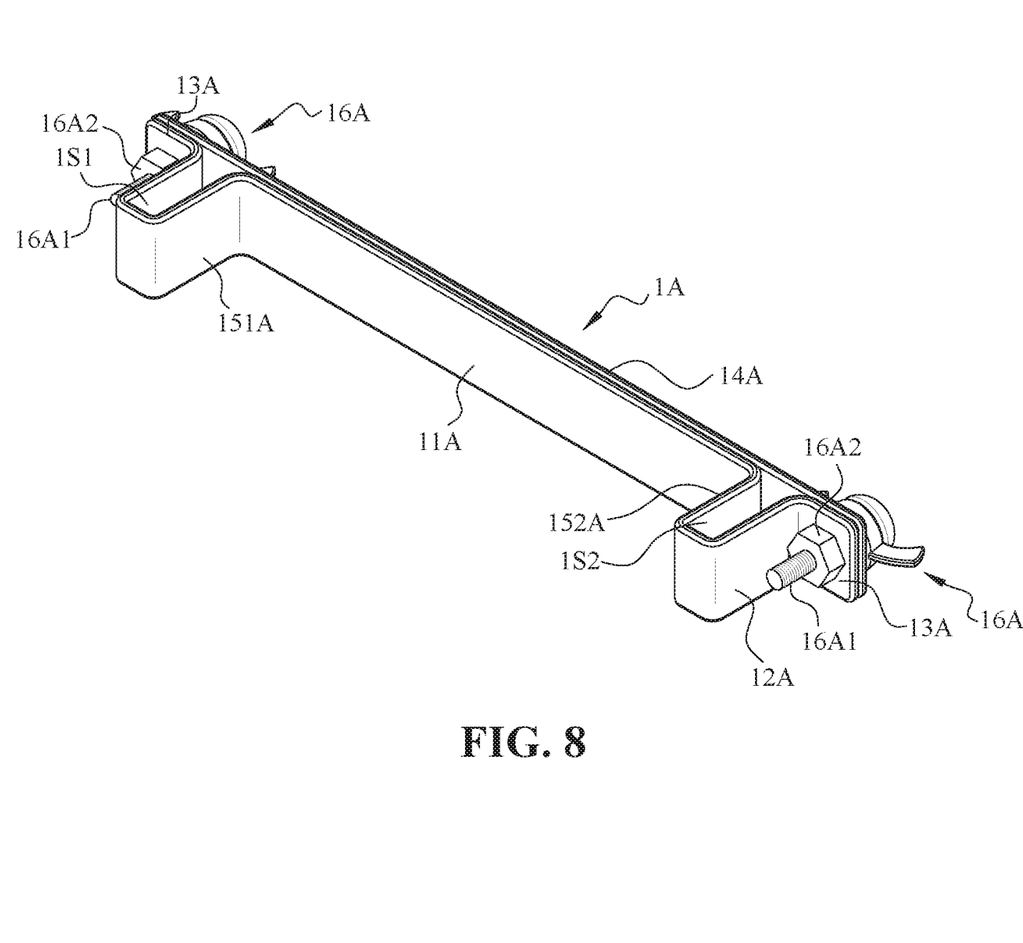
FIG. 8 is a perspective view of the chair fixing device according to the second embodiment of the present invention, wherein the locking plate of the fixing device is shown in a locked position relative to the encircle element.

FIG. 7 is a perspective view of a chair fixing device 1A according to a second embodiment of the present invention, wherein the locking plate of the fixing device is shown in an unlocked position relative to the encircle element while FIG. 8 is a perspective view of the chair fixing device 1A according to the second embodiment of the present invention, wherein the locking plate of the fixing device is shown in a locked position relative to the encircle element. As illustrated, the chair fixing device 1A of the present invention includes an encircle element 11A having left and right lateral sides 13A and left and right flap portions 151A, 152A that are located inwardly of the left and right lateral sides 13A, that has at least one straight confining section 12A and that extend transversely and outwardly from the left and right lateral sides 13A to define left and right chambers 1S1, 1S2 respectively which are accessible only from the same direction, each of the left and right lateral sides 13A being formed with a through hole; a fixing element 16A installed to the encircle element 11A at one of the through holes in the encircle element 11A; and a locking plate 14A having a first end fastened movably to one of the through holes in the encircle element 11A via a fastener and a second end such that the locking plate 14A is movable relative to the encircle element 11A between a locked position, in which the locking plate 14A moves toward the encircle element 11A and hence engaging the second end of the locking plate 14 to the fixing element 11A, thereby shielding and preventing access into the left and right chambers 1S1, 1S2, and an unlocked position, in which the locking plate 14A moves away from the encircle element 11A and hence disengaging the second end of the locking plate 14A from the fixing element 11A, thereby permitting access into the left and right chambers 1S1, 1S2 respectively.

Preferably, an auxiliary fixing element 16A serves the purpose of the above-mentioned fastener.

Alternately, a rivet may serve the purpose of the above-mentioned fastener.

Note that in the second embodiment, when the locking plate 14A is at the locked position, two opposite left and right ends of the locking plate 14A engage the fixing elements 16A respectively, thereby shielding and preventing access into the left and right chambers 1S1, 1S2, and when at the unlocked position, the left and right ends of the locking plate 14A disengage the fixing elements 16A respectively, thereby permitting access into the left and right chambers 1S1, 1S2.

In the second embodiment, each of the fixing elements 16A consists of a wing bolt 16A1 and a fastening nut 16A2 and wherein each of the left and right ends of the locking plate 14A is formed with a U-shaped notch 142A having a width greater than a diameter of the wing bolt 16A1 so as to permit engagement of the notches 142A relative to the wing bolts 16A1. Once the locking plate 14A is moved to the locked position, rotation of the wing bolts 16A1 relative to the fastening nuts 16A2 can result in tightening of the fixing element 16A, thereby preventing untimely disengagement of the locking plate 14A from the encircle element 11A, as best shown in FIG. 8.

Since the connecting and fixing the front and rear legs 21 of an adjacent pair of chairs 2 by the fixing device 1A according to the second embodiment of the present invention is the same as the previous embodiment, as shown in FIGS. 5 and 6, a detailed description thereof will be omitted herein for the sake of brevity.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fixing device for fixing two adjacent chairs, comprising:
   an encircle element having left and right lateral sides and left and right flap portions that are located inwardly of said left and right lateral sides, that has at least one straight confining section and that extend transversely and outwardly from said left and right lateral sides to define left and right chambers respectively which are accessible only from the same direction, each of said left and right lateral sides being formed with a through hole;
   a fixing element installed to said encircle element at one of said through holes in said encircle element; and
   a locking plate having a first end fastened movably to one of said through holes in said encircle element via a fastener and a second end such that said locking plate is movable relative to said encircle element between a locked position, in which said locking plate moves toward said encircle element and hence engaging said second end of said locking plate to said fixing element, thereby shielding and preventing access into said left and right chambers, and an unlocked position, in which said locking plate moves away from said encircle element and hence disengaging said second end of said locking plate from said fixing element, thereby permitting access into said left and right chambers,
   wherein said fixing element comprises a wing bolt and a fastening nut and wherein each of said first and second ends of said locking plate are formed with a U-shaped notch having a width greater than a diameter of said wing bolt so that said notches are configured to engage with said wing bolts.

2. The fixing device according to claim 1, wherein said fastener is an auxiliary fixing element having the same structure as said fixing element.

3. The fixing device according to claim 1, wherein said fastener is a rivet.

4. The fixing device according to claim 1, wherein said encircle element is generally an elongated integral piece which has undergone bending machining so as to form said left and right flap portions and said left and right chambers.

5. The fixing device according to claim 2, wherein said left and right chambers of said encircle element are generally U-shaped and are located inwardly of said left and right lateral sides.

* * * * *